US010357995B2

(12) United States Patent
Palmer et al.

(10) Patent No.: US 10,357,995 B2
(45) Date of Patent: Jul. 23, 2019

(54) WHEEL ADAPTER FOR A MOBILE LIFT DEVICE

(71) Applicant: Oshkosh Corporation, Oshkosh, WI (US)

(72) Inventors: David J. Palmer, Neenah, WI (US); Andrew J. Kotloski, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 160 days.

(21) Appl. No.: 14/693,479

(22) Filed: Apr. 22, 2015

(65) Prior Publication Data

US 2016/0311253 A1    Oct. 27, 2016

(51) Int. Cl.
*B60B 23/06*    (2006.01)
*B60B 23/12*    (2006.01)
(Continued)

(52) U.S. Cl.
CPC .............. *B60B 23/06* (2013.01); *B60B 21/02* (2013.01); *B60B 23/12* (2013.01);
(Continued)

(58) Field of Classification Search
CPC .......... B60Y 2200/49; B60Y 2900/351; B60B 23/06; B60B 21/02; B60B 23/12;
(Continued)

(56) References Cited

U.S. PATENT DOCUMENTS 3,232,189 A * 2/1966 Young ................... B60B 23/12
                                                                    180/22
3,588,981 A * 6/1971 Beharrell et al. ....... B60B 21/02
                                                                    29/450
(Continued)

FOREIGN PATENT DOCUMENTS

AU    2903268 A1 * 10/2013  ............. B60B 23/06
CA    2903268 A1 * 10/2013  ............. B60B 23/06
(Continued)

OTHER PUBLICATIONS

U.S. Appl. No. 14/514,210, filed Oct. 14, 2014, Oshkosh Corporation.
(Continued)

*Primary Examiner* — Katherine W Mitchell
*Assistant Examiner* — Candace L Bradford
(74) *Attorney, Agent, or Firm* — Foley & Lardner LLP (57) ABSTRACT

A lift device includes a wheel assembly coupled to a frame. The wheel assembly includes a rim having an inner barrel, an outer barrel, and a lip defining a first surface and a second surface. The lift device also includes an adapter plate and an axle having a first end coupled to the frame and a second end including a hub. The adapter plate includes a barrel portion defining a first face and a second face, a hub portion directly coupled to the hub, and a transition portion extending between the barrel portion and the hub portion. The second surface of the lip engages the first face of the barrel portion when the wheel assembly is in a first configuration and the second face of the barrel portion when the wheel assembly is in a second configuration thereby reducing a track width of the lift device.

11 Claims, 9 Drawing Sheets

(51) Int. Cl.
*B66F 9/075* (2006.01)
*B66F 11/04* (2006.01)
*B60B 21/02* (2006.01)

(52) U.S. Cl.
CPC ...... *B66F 9/07522* (2013.01); *B66F 9/07586* (2013.01); *B66F 11/044* (2013.01); *B66F 11/046* (2013.01); *B60B 2900/351* (2013.01); *B60Y 2200/49* (2013.01)

(58) Field of Classification Search
CPC .............. B66F 9/07522; B66F 9/07586; B66F 11/044; B66F 11/046
See application file for complete search history.

(56) References Cited

U.S. PATENT DOCUMENTS

| | | | |
|---|---|---|---|
| 3,606,473 A * | 9/1971 | Lemon | B60B 23/12 301/9.2 |
| 5,951,235 A | 9/1999 | Young et al. | |
| 6,315,515 B1 | 11/2001 | Young et al. | |
| 6,336,783 B1 | 1/2002 | Young et al. | |
| 6,447,239 B2 | 9/2002 | Young et al. | |
| 6,565,305 B2 | 5/2003 | Schrafel | |
| 7,070,382 B2 | 7/2006 | Pruteanu et al. | |
| 7,284,943 B2 | 10/2007 | Pruteanu et al. | |
| 7,489,098 B2 | 2/2009 | Harris et al. | |
| 7,549,667 B2 | 6/2009 | Busuttil et al. | |
| 7,559,735 B2 | 7/2009 | Pruteanu et al. | |
| 7,671,547 B2 | 3/2010 | Addleman | |
| 7,878,750 B2 | 2/2011 | Zhou et al. | |
| 7,909,561 B2 | 3/2011 | Addleman et al. | |
| 8,182,194 B2 | 5/2012 | Pruteanu et al. | |
| 8,337,352 B2 | 12/2012 | Morrow et al. | |
| 8,360,706 B2 | 1/2013 | Addleman et al. | |
| 8,540,475 B2 | 9/2013 | Kuriakose et al. | |
| 8,807,613 B2 | 8/2014 | Howell et al. | |
| 8,864,613 B2 | 10/2014 | Morrow et al. | |
| 9,139,409 B2 | 9/2015 | Perron | |
| 2014/0238704 A1 | 8/2014 | Moore et al. | |
| 2014/0269145 A1 | 9/2014 | Fasana et al. | |
| 2015/0016931 A1 | 1/2015 | Kuriakose et al. | |
| 2015/0033962 A1 | 2/2015 | Schwartz et al. | |
| 2015/0175353 A1 | 6/2015 | Gillmore et al. | |
| 2015/0259185 A1 | 9/2015 | Ditty | |

FOREIGN PATENT DOCUMENTS

| | | | | |
|---|---|---|---|---|
| CA | 2879172 A1 | * | 1/2014 | ............. B60B 35/10 |
| DE | 102011083834 A1 | * | 4/2013 | ............. B60B 1/14 |
| FR | 2879172 A1 | * | 1/2014 | ............. B60B 35/10 |
| GB | 0 483 126 | | 4/1938 | |
| GB | 0 666 112 | | 2/1952 | |
| GB | 2 082 986 | | 3/1982 | |
| GB | 2082986 A | * | 3/1982 | ......... B60B 35/1054 |
| JP | 102011083834 A1 | * | 4/2013 | ............. B60B 1/14 |

OTHER PUBLICATIONS

U.S. Appl. No. 14/532,679, filed Nov. 4, 2014, Oshkosh Corporation.
U.S. Appl. No. 14/563,728, filed Dec. 8, 2014, Oshkosh Corporation.
U.S. Appl. No. 14/624,285, filed Feb. 17, 2015, Oshkosh Corporation.
U.S. Appl. No. 14/693,479, filed Apr. 22, 2015, Oshkosh Corporation.
U.S. Appl. No. 14/792,532, filed Jul. 6, 2015, Oshkosh Corporation.
U.S. Appl. No. 14/792,535, filed Jul. 6, 2015, Oshkosh Corporation.
International Search Report and Written Opinion for PCT application No. PCT/US2016/028497, dated Jul. 21, 2016, 15 pages.

* cited by examiner

WHEEL ADAPTER FOR A MOBILE LIFT DEVICE

BACKGROUND

Traditional lift devices have a wide track width to improve stability when using an operational device. Such operational devices support an operator (e.g., on an aerial work platform, etc.) or another load (e.g., using lift forks, etc.) in an elevated position relative to a ground surface. The wide track width prevents traditional lift devices from driving into standard ISO containers for shipping purposes. In order to fit traditional lift devices within standard ISO containers, the track width is traditionally reduced by either increasing the counterweight or by fitting the lift device with specialized shipping wheels. Such solutions increase the overall cost and the overall shipping weight of the lift device.

SUMMARY

One embodiment relates to a lift device. The lift device includes a chassis having a frame, a lift boom rotatably coupled to the frame, and a wheel assembly coupled to the frame and selectively reconfigurable between a first configuration and a second configuration. The wheel assembly includes a rim having an inner barrel, an outer barrel, and a lip defining a first surface and an opposing second surface; and a tire mounted to the rim. The lift device also includes an adapter plate and an axle having a first end coupled to the frame and a second end including a hub. The adapter plate includes a barrel portion defining a first face and an opposing second face, a hub portion directly coupled to the hub, and a transition portion extending between the barrel portion and the hub portion. The first face of the barrel portion of the adapter plate engages the opposing second surface of the lip when the wheel assembly is in the first configuration and the opposing second face of the barrel portion of the adapter plate engages the opposing second surface of the lip when the wheel assembly is in the second configuration thereby reducing a track width of the lift device.

Another embodiment relates to a wheel assembly for a lift device. The wheel assembly includes a rim having an inner barrel, an outer barrel, and a lip defining a first surface and an opposing second surface, a tire mounted to the rim, an axle having a first end configured to be coupled to a frame of the lift device and a second end including a hub, and an adapter plate. The adapter plate includes a barrel portion having a first face and an opposing second face, a hub portion directly coupled to the hub, and a transition portion extending between the barrel portion and the hub portion. The first face of the barrel portion of the adapter plate engages the opposing second surface of the lip when the wheel assembly is in a first configuration and the second opposing face of the barrel portion of the adapter plate engages the opposing second surface of the lip when the wheel assembly is in a second configuration thereby reducing a width of the wheel assembly.

Still another embodiment relates to an adapter plate for coupling a wheel assembly to a hub of a lift device. The adapter plate includes a barrel portion defining a first face and an opposing second face, the barrel portion sized to fit within a wheel assembly, a hub portion including a first face and an opposing second face, the hub portion sized to correspond with the hub of the lift device, and a transition portion extending between the barrel portion and the hub portion.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a lift device includes wheel assemblies coupled to a frame of the lift device with adapter plates. In one embodiment, the wheel assemblies may be oriented in either a first configuration (e.g., an operating configuration, etc.) or a second configuration (e.g., a storage configuration, etc.). The lift device utilizes a wide track width in the first configuration to improve operational stability when the lift device is used in a work envelope (e.g., operating range, etc.). The wide track width may prevent the lift device from fitting into a standard International Standards Organization (ISO) container. The adapter plates may couple the wheels to the frame of the lift device in the second configuration, reducing the track width such that the lift device may be driven into a standard ISO container for shipping purposes. The adapter plate reduces the track width without increasing the counterweight or requiring use of replacement wheels specifically adapted for shipping the lift device. The adapter plates thereby do not add to the overall cost or weight of the lift device. The lift device may be any type of wheeled device that utilizes a wide track for stability that may be shipped in a standard ISO container (e.g., a lift boom, an aerial work platform, a telehandler, etc.).

Figure 1:
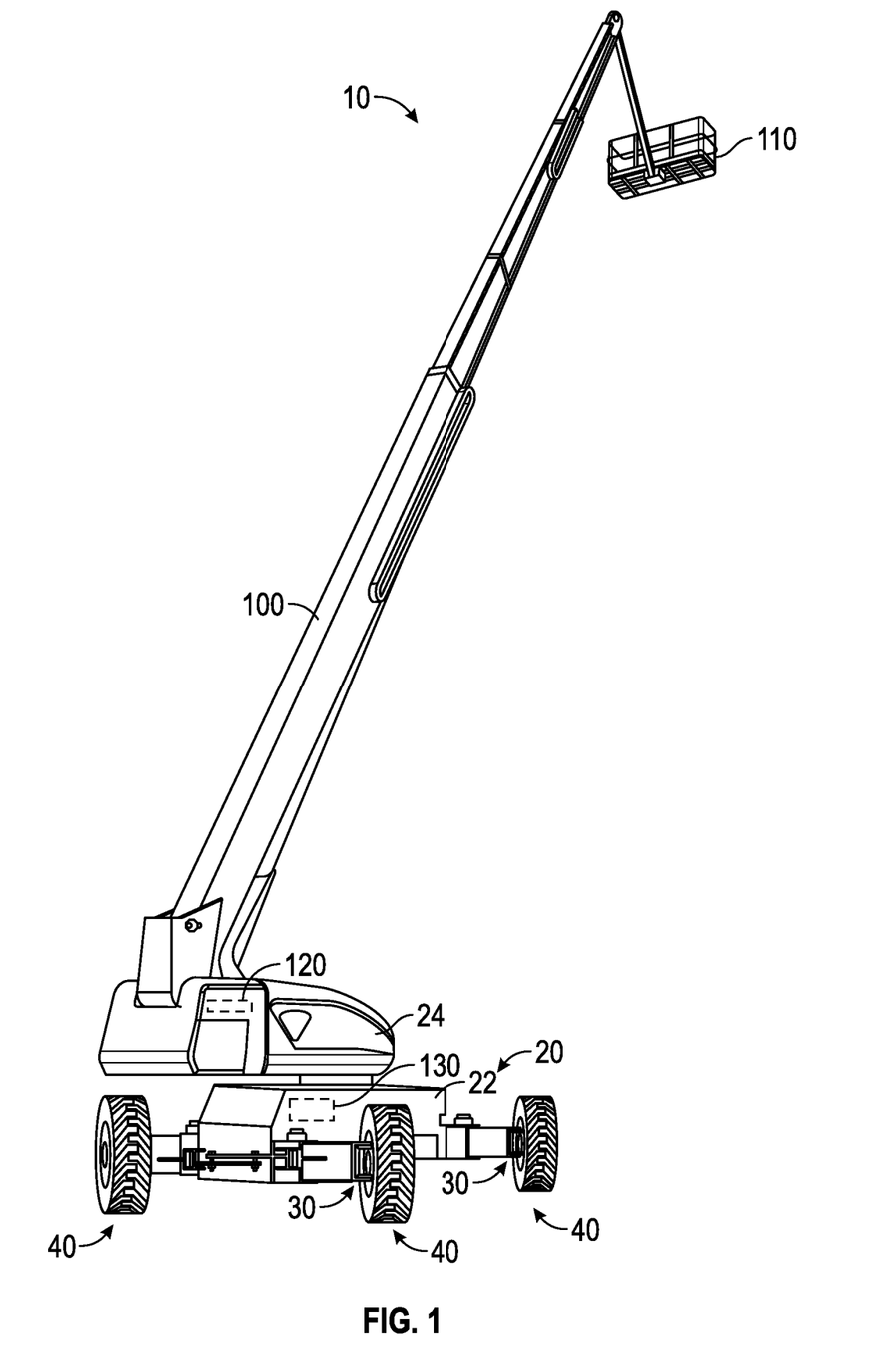
FIG. 1 is a perspective view of a lift device, according to an exemplary embodiment.
Figure 2:
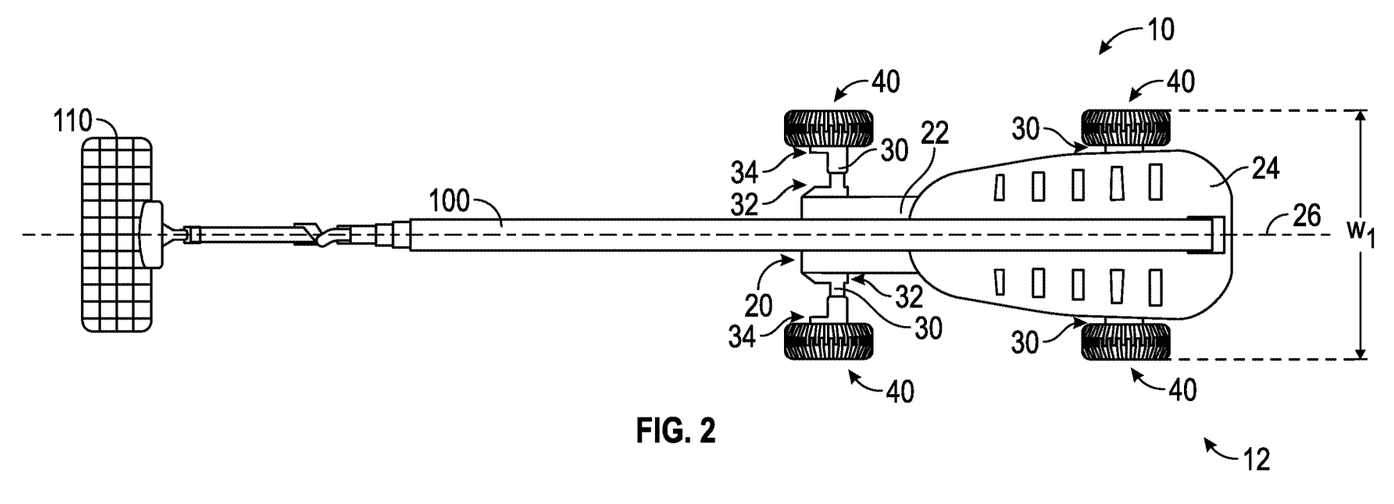
FIG. 2 is a top plan view of a lift device in a first configuration, according to an exemplary embodiment.
Figure 3:
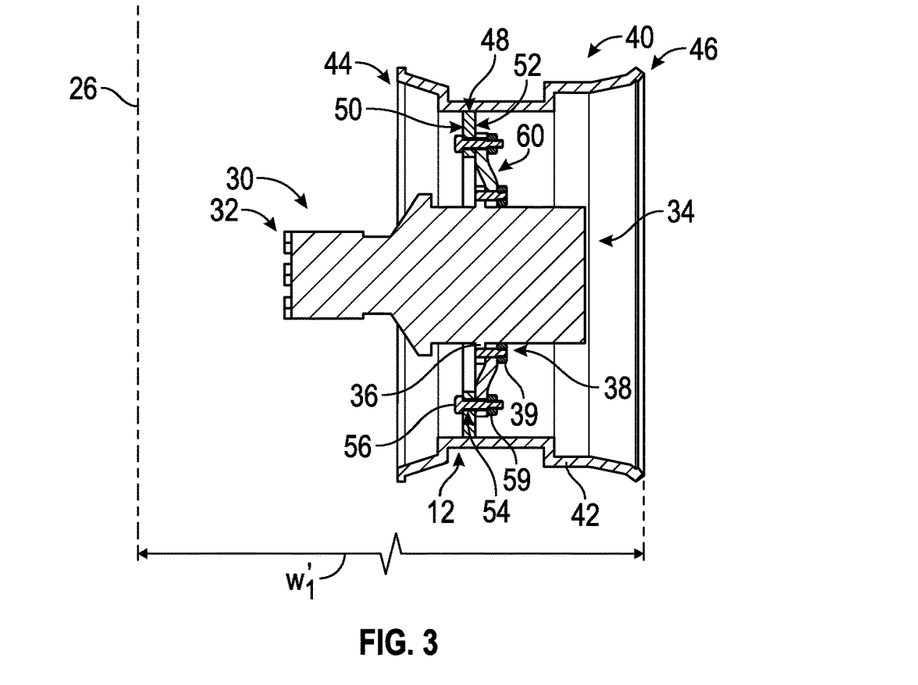
FIG. 3 is a detail cross-sectional view of a wheel assembly, an axle, and an adapter plate in the first configuration, according to an exemplary embodiment.
Figure 4:
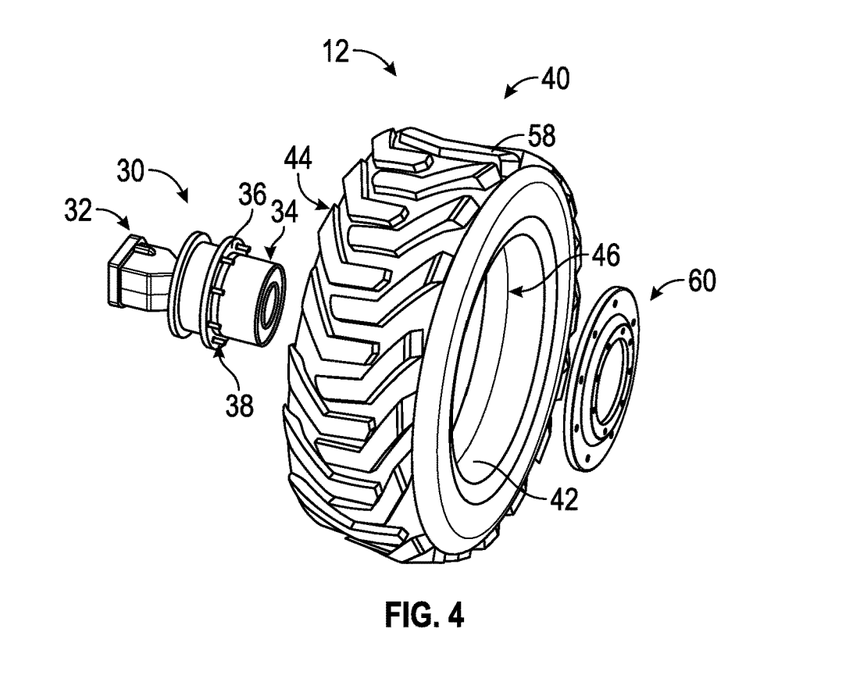
FIG. 4 is an exploded view of a wheel assembly, an axle, and an adapter plate in the first configuration, according to an exemplary embodiment.
Figure 5:
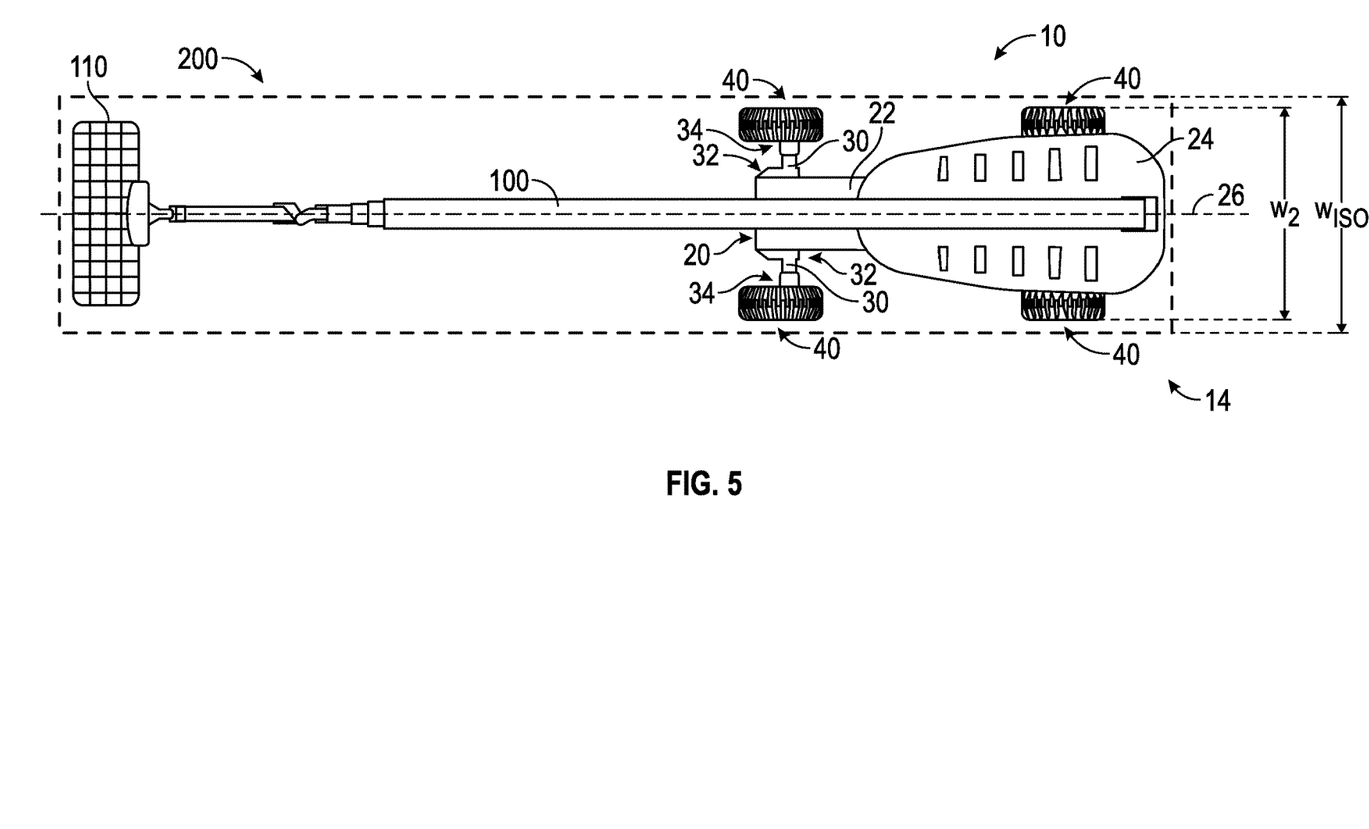
FIG. 5 is a top plan view of a lift device in a second configuration, according to an exemplary embodiment.

According to the exemplary embodiment shown in FIGS. 1-10, a lift device, shown as lift device 10, includes a chassis, shown as chassis 20. As shown in FIGS. 2 and 5, chassis 20 defines an axis, shown as longitudinal axis 26. According to an exemplary embodiment, the chassis 20 includes a frame, shown as frame 22. As shown in FIGS. 1-7, the lift device includes an axle, shown as axle 30, coupled to the frame 22. In one embodiment, the lift device 10 includes a plurality of independent axles 30 (e.g., four, etc.) coupled to the frame 22. In another embodiment, the lift device 10 includes a first solid axle 30 coupled to a front end of the frame 22 and a second solid axle 30 coupled to a rear end of the frame 22. As shown in FIGS. 1-7, each axle 30 includes a first end, shown as frame end 32, and a second end, shown as wheel end 34. A wheel assembly, shown as wheel assembly 40, is coupled to the wheel end 34 of each axle 30. The frame end 32 of the axle 30 is coupled to the frame 22 such that the wheel assembly 40 is coupled to the frame 22 with the axle 30. In one embodiment, the wheel assembly 40 may be selectively coupled to the wheel end 34 of the axle 30 in a first configuration (e.g., an operating configuration, a working configuration, etc.) and in a second configuration (e.g., a storage configuration, a shipping configuration, etc.).

According to an exemplary embodiment, the lift device 10 includes an actuator positioned to move the axle 30. The actuator may be a linear actuator (e.g., a hydraulic cylinder, etc.), extension and retraction thereof moving the corresponding axle 30. By way of another example, the actuator may drag or push the corresponding wheel assemblies 40 to rotate the corresponding axles 30. By way of still another example, one or more actuators may turn the wheel assemblies 40 to facilitate rotation of the axles 30 by the actuator. In other embodiments, the lift device 10 includes another type of actuator (e.g., a rotational actuator, a wheel drive, etc.) positioned to otherwise move the corresponding axles 30. By way of example, a first actuator may be positioned to turn at least one of the wheel assemblies 40, and a second actuator (e.g., a wheel drive motor, etc.) drives the wheel assembly 40 along a curved path to rotate the corresponding axle 30. By way of another example, the actuator may be a wheel drive motor configured to drive lift device 10 and move at least one of the axles 30. Such a system may or may not employ linear actuators (e.g., hydraulic cylinders, etc.) to rotate the axles.

As shown in FIGS. 1-2 and 5, the lift device 10 includes a lift boom, shown as lift boom 100. According to an exemplary embodiment, the lift boom 100 is rotatably coupled to the chassis 20. As shown in FIGS. 1-2 and 5, the lift boom 100 is coupled to a turntable 24 that is configured to rotate relative to the frame 22. Rotation of the turntable 24 may be facilitated by a bearing disposed between the turntable 24 and the frame 22. As shown in FIGS. 1-2 and 5, an operational device, shown as aerial work platform 110, is coupled to the lift boom 100. In another embodiment, the operational device includes lift forks or another system configured to support a working load.

Referring still to FIGS. 1-2 and 5, the lift boom 100 includes a plurality of telescoping boom sections. An actuator may extend the plurality of telescoping boom sections to increase the extension length of the lift boom 100 (e.g., during operation of the lift device 10 by an operator aboard the aerial work platform 110, etc.). According to the exemplary embodiment shown in FIG. 1, the lift boom 100 is pivotally coupled to the turntable 24 such that the aerial work platform 110 may be elevated relative to a ground surface. In one embodiment, an actuator pivots the lift boom 100 upward, thereby increasing a working height of the aerial work platform 110.

As shown in FIG. 1, the lift device 10 includes a controller 120. The controller 120 is configured to facilitate various operations of the lift device 10. By way of example, the controller 120 may be configured to provide command signals relating to the rotation of the turntable 24 and the lift boom 100 relative to the frame 22, the extension of the lift boom 100, and the rotation of at least one of the wheel assemblies 40 (e.g., to drive the lift device 10, etc.). The controller 120 may also be configured to engage at least one actuator to facilitate movement of at least one of the wheel assemblies 40, the turntable 24, the lift boom 100, and the aerial work platform 110. By way of another example, the controller 120 may be communicably coupled with an operator input/output (I/O) device such that an operator of the lift device 10 may provide a variety of commands to the controller 120.

The aerial work platform 110 may provide a surface upon which operators stand while operating the lift device 10 with an I/O device. In one embodiment, the I/O device is communicably coupled to various components of the lift device 10 (e.g., the wheel assemblies 40, the turntable 24, the lift boom 100, the aerial work platform 110, etc.) such that information or signals (e.g., command signals, etc.) may be exchanged to and from the I/O device. By way of example, the I/O device may include at least one of an interactive display, a touchscreen device, one or more buttons, joysticks, switches, and/or voice command receivers. An operator may use a joystick associated with the I/O device to trigger the engagement of an actuator positioned to turn one of the wheel assemblies 40, thereby turning the lift device 10 towards a desired location. By way of another example, an operator may engage a lever associated with the I/O device to trigger the extension or retraction of the plurality of sections of the lift boom 100.

Referring again to the embodiment shown in FIG. 1, the lift device 10 includes a sensor, shown as sensor 130. The sensor 130 may be positioned to provide sensor signals relating to the configuration (e.g., first configuration, second configuration, operating configuration, storage configuration, etc.) of one or more of the wheel assemblies 40. Sensor 130 may be communicably coupled to controller 120. Controller 120 may evaluate the sensor signals to determine a configuration of the wheel assemblies 40 or lift device 10. By way of example, if the controller 120 determines that the lift device 10 is arranged in the second configuration (e.g., storage configuration, etc.), the controller 120 may not allow an operator to control (e.g., lift, extend, rotate, etc.) the lift boom 100. In another embodiment, the sensor 130 is positioned to monitor an orientation (e.g., position, extension, elevation, etc.) of the lift boom 100. By way of example, the sensor 130 may include a rotational position sensor that monitors the relative movement of two components (e.g., the movement of the turntable 24 relative to the frame 22, the movement of the aerial work platform 110 relative to the frame 22, etc.). By way of another example, the rotational position sensor may monitor the absolute rotational position of the turntable 24, the lift boom 100, or still another component. Controller 120 may evaluate the sensor signals to determine an orientation of the lift device 10.

Figure 6:
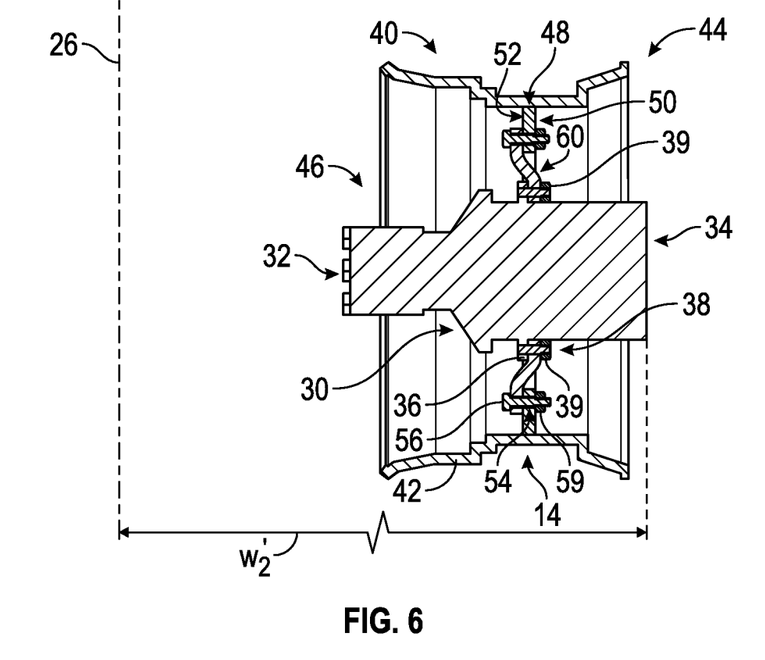
FIG. 6 is a detail cross-sectional view of a wheel assembly, an axle, and an adapter plate in the second configuration, according to an exemplary embodiment.
Figure 7:
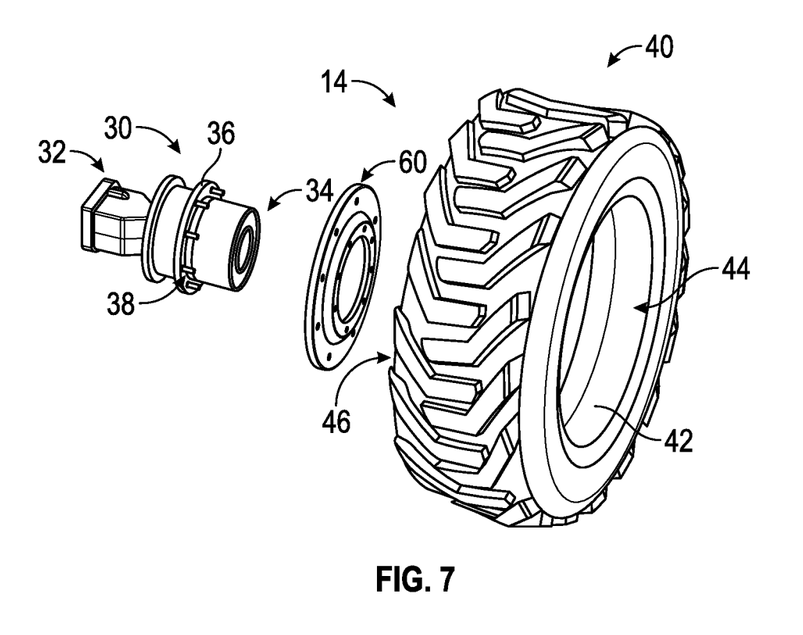
FIG. 7 is an exploded view of a wheel assembly, an axle, and an adapter plate in the second configuration, according to an exemplary embodiment.

As shown in FIGS. 2-7, the wheel assembly 40 is coupled to the frame 22 with the axle 30 and an adapter plate, shown as adapter plate 60. The adapter plate 60 facilitates coupling the wheel assembly 40 to the frame 22 in either a first configuration, shown in FIGS. 3-4 as operating configuration 12, or a second configuration, shown in FIGS. 6-7 as storage configuration 14. As shown in FIGS. 4 and 7, the axle 30 includes a hub, shown as hub 36. The hub 36 is positioned between the frame end 32 and the wheel end 34 of the axle 30. The hub 36 may be positioned closer to the wheel end 34 than the frame end 32 (e.g., at wheel end 34, etc.). The hub 36 includes a plurality of fasteners (e.g., threaded rods, etc.), shown as studs 38, positioned around a periphery of the hub 36.

As shown in FIGS. 3-4 and 6-7, the wheel assembly 40 includes a wheel, shown as rim 42, and a tire 58 mounted to the rim 42. As shown in FIGS. 3 and 5, the rim 42 includes a first barrel, shown as inner barrel 44, and a second barrel, shown as outer barrel 46. In one embodiment, the inner barrel 44 and the outer barrel 46 form a continuous structure (e.g., single, unitary, etc.). In another embodiment, the inner barrel 44 and the outer barrel 46 are fastened (e.g., bolted, etc.) together to form the rim 42. As shown in FIGS. 3 and 5, rim 42 includes an interface, shown as lip 48. The lip 48 defines a plurality of apertures, shown as apertures 54, positioned around a periphery of the lip 48. As shown in FIGS. 3 and 5, the lip 48 has a first surface, shown as inner surface 50, and an opposing second surface, shown as outer surface 52.

Figure 8:
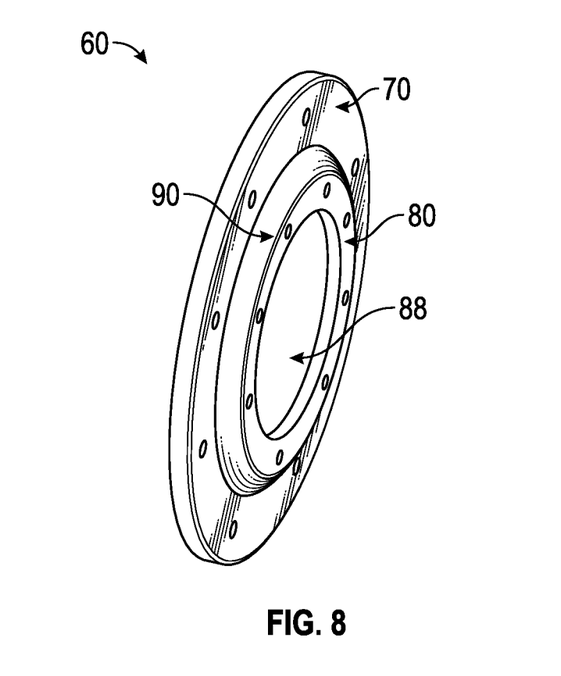
FIG. 8 is a side perspective view of an adapter plate, according to an exemplary embodiment.
Figure 9:
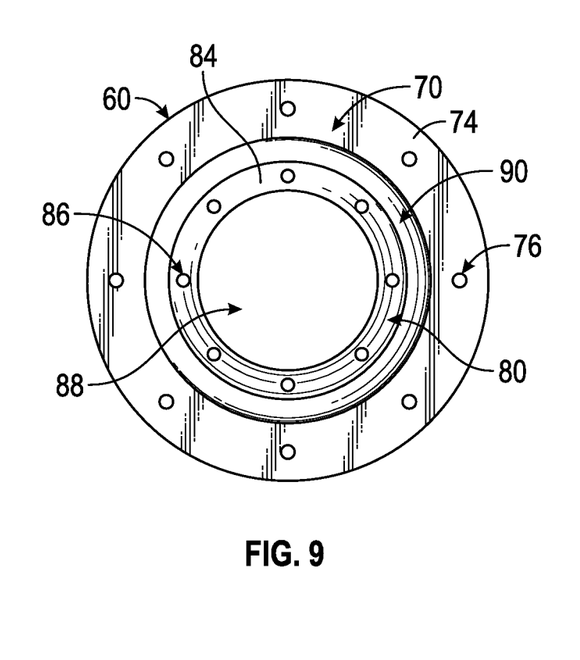
FIG. 9 is front plan view of an adapter plate, according to an exemplary embodiment.
Figure 10:
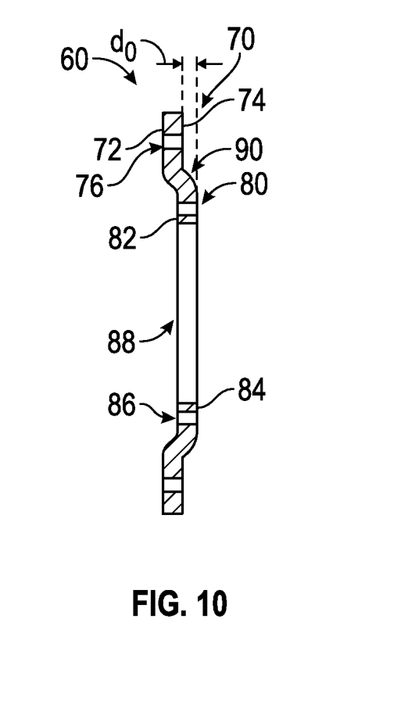
FIG. 10 is a cross-sectional view of an adapter plate, according to an exemplary embodiment.

As shown in FIGS. 8-10, the adapter plate 60 includes a first body portion, shown as barrel portion 70, a second body portion, shown as hub portion 80, and third body portion, shown as transition portion 90. The transition portion 90 extends between the barrel portion 70 and the hub portion 80 such that the adapter plate 60 forms a single unitary structure. As shown in FIG. 10, the barrel portion 70 and the hub portion 80 are offset a distance, shown as offset distance $d_o$, from one another. The offset distance $d_o$ may be specified to define the shape (e.g., length, angle, etc.) of the transition portion 90 of the adapter plate 60. By way of example, a greater offset distance $d_o$ may correspond with a longer transition portion 90. The length of the transition portion 90 (e.g., offset distance $d_o$, etc.) may be specified to vary the offset of the wheel assembly 40 from the frame 22 of the lift device 10. In one embodiment, the adapter plate 60 has a small offset distance $d_o$ (e.g., less than the thickness of the barrel portion 70, less than the thickness of the hub portion 80, etc.). The hub portion 80 and the barrel portion 70 may be substantially coplanar, defining an adapter plate 60 that is substantially flat. In another embodiment, the offset distance $d_o$ is larger. The offset distance $d_o$ may be specified to achieve a desired track width of the lift device 10 when wheel assemblies 40 are arranged in either the operating configuration 12 or the storage configuration 14.

As shown in FIGS. 8-10, the barrel portion 70 of the adapter plate 60 defines a first face (e.g., a first planar face, etc.), shown as rear face 72, and an opposing second face (e.g., an opposing second planar face, etc.), shown as front face 74. In one embodiment, the rear face 72 of the barrel portion 70 is configured to abut the outer surface 52 of the lip 48 when the wheel assembly 40 is arranged in the operating configuration 12. The front face 74 of the barrel portion 70 is configured to abut the outer surface 52 of the lip 48 when the wheel assembly 40 is arranged in the storage configuration 14. As shown in FIGS. 8-10, the barrel portion 70 defines a plurality of apertures, shown a barrel bolt pattern 76. In one embodiment, the barrel bolt pattern 76 includes apertures that are spaced to correspond with the plurality of apertures 54 positioned around the periphery of the lip 48.

Referring still to FIGS. 8-10, the hub portion 80 of the adapter plate 60 defines a first face, shown as rear face 82, and an opposing second face, shown as front face 84. According to an exemplary embodiment, the rear face 82 of the hub portion 80 is configured to abut the hub 36 of the axle 30 when the wheel assemblies 40 are arranged in the operating configuration 12 and the storage configuration 14. As shown in FIGS. 8-10, the hub portion 80 defines a plurality of apertures, shown a hub bolt pattern 86. In one embodiment, the hub bolt pattern 86 includes apertures that are spaced to correspond with the plurality of studs 38 positioned around the periphery of the hub 36. As shown in FIG. 8-10, the hub portion 80 of the adapter plate 60 defines a central aperture, shown as center bore 88. The center bore 88 is sized and positioned to receive the wheel end 34 of the axle 30 such that the wheel end 34 may extend further laterally outward relative to the hub 36 when the adapter plate 60 is coupled to the axle 30.

As shown in FIGS. 2-4, wheel assembly 40 is arranged in the operating configuration 12. In the operating configuration 12, the lift boom 100 of the lift device may be controlled (e.g., rotated, extended, etc.) by an operator. As shown in FIG. 2, the track width of the lift device 10 (e.g., a lateral distance from the outside of a first front wheel assembly 40 to the outside of a second front wheel assembly 40, a lateral distance from the outside of a first rear wheel assembly 40 to the outside of a second rear wheel assembly 40, etc.) is set to a working width $w_1$ when the wheel assemblies 40 are arranged in the operating configuration 12. In the operating configuration 12, the lift boom 100 may be operated within a work envelope. The work envelope is defined by the volume within which the lift boom 100 or the aerial work platform 110 may be operated without the lift device 10 reaching a point where the center of gravity for the lift device 10 extends past a stability line. In one embodiment, the physical characteristics of the lift device 10 are specified to provide a desired work envelope. By way of example, the track width of the lift device 10, a length of the wheelbase of the lift device 10, the weight of a counterweight supported by the frame 22 or turntable 24, the weight of the lift boom 100, or still other characteristics may be specified to provide a desired work envelope.

Referring to FIGS. 3-4, the axle 30, the wheel assembly 40, and the adapter plate 60 are arranged in the operating configuration 12. As shown in FIGS. 3-4, the adapter plate 60 attaches to the lip 48 from the outer barrel 46 side of the rim 42, while the axle 30 extends into the inner barrel 44 side of the rim 42. As shown in FIGS. 3 and 8-10, the rear face 72 of the barrel portion 70 of the adapter plate 60 abuts the outer surface 52 of the lip 48 when arranged in the operating configuration 12. The apertures of the barrel bolt pattern 76 are positioned around the barrel portion 70 of the adapter plate 60 such that the apertures of the barrel bolt pattern 76 interface with (e.g., align, correspond, match up, etc.) the plurality of apertures 54 positioned around the periphery of the lip 48. As shown in FIG. 3, the adapter plate 60 and the rim 42 are coupled with a plurality of fasteners (e.g., bolts, rivets, etc.), shown as bolts 56, extending through or pressed into the apertures 54 and extending through the apertures of barrel bolt pattern 76. In one embodiment, the bolts 56 engage a plurality of fasteners, shown as lug nuts 59, to secure the adapter plate 60 to the rim 42 in the operating configuration 12. In other embodiments, the adapter plate 60 and the rim 42 are otherwise coupled (e.g., interlocking, etc.).

According to an exemplary embodiment, the hub 36 of the axle 30 abuts the rear face 82 of the hub portion 80 of the adapter plate 60 when wheel assembly 40 is arranged in the operating configuration 12. As shown in FIGS. 3 and 8-10, the wheel end 34 of the axle 30 extends through the center bore 88 of the adapter plate 60 when the axle 30 is coupled to the adapter plate 60. In one embodiment, the apertures of the hub bolt pattern 86 are positioned around the barrel portion 70 of the adapter plate 60 to correspond with the studs 38 positioned around the periphery of the hub 36. In one embodiment, the studs 38 engage a plurality of fasteners, shown as lug nuts 39, to secure the adapter plate 60 to the axle 30 and couple the wheel assembly 40 to the frame 22 of the lift device 10. In another embodiment, hub 36 includes a plurality of threaded apertures that correspond with the apertures of hub bolt pattern 86. The plurality of threaded apertures of hub 36 may receive a plurality of fasteners (e.g., bolts, etc.) to secure the adapter plate 60 to the axle 30.

As shown in FIG. 3, a width $w_1'$ is defined when the wheel assembly 40 is coupled to the axle 30 with the adapter plate 60 in the operating configuration 12. The width $w_1'$ may be the distance between the longitudinal axis 26 and an outer portion of lift device 10 when the wheel assembly 40 and the axle 30 are coupled together in the operating configuration 12. The outer portion of the lift device 10 may be the outer barrel 46 or the tire 58, among other alternatives. The width $w_1'$ is directly related (e.g., proportional, linked, etc.) to the working width $w_1$. By way of example, a decrease in the width $w_1'$ may provide a corresponding decrease in the working width $w_1$. By way of example, the width $w_1'$ may be specified by specifying the offset distance $d_o$ of the adapter plate 60, positioning the lip 48 in a target location between the inner barrel 44 and the outer barrel 46, or positioning the hub 36 in a target location along the length of the axle 30, among other alternatives.

As shown in FIGS. 5-7, wheel assembly 40 is arranged in the storage configuration 14, such that the lift device 10 is able to be stored and transported (e.g., shipped, etc.) within a standard shipping container, shown as ISO container 200. As shown in FIG. 5, the track width of the lift device 10 is set to a storage width $w_2$. The storage width $w_2$ is less than the width $w_{ISO}$ of the ISO container. The lift device 10 may thereby to fit within the ISO container 200 when arranged in the storage configuration 14. In one embodiment, the storage width $w_2$ of the lift device 10 when arranged in the storage configuration 14 is less than 7 feet and 8.125 inches.

As shown in FIGS. 6-7, the axle 30, the wheel assembly 40, and the adapter plate 60 are arranged in the storage configuration 14. In the storage configuration 14, the wheel assembly 40 may be inverted (e.g., flipped, etc.) relative to the position of the wheel assembly 40 when arranged in the operating configuration 12. As shown in FIGS. 6-7, the adapter plate 60 and the axle 30 attach to the lip 48 from the outer barrel 46 side of the rim 42. As shown in FIGS. 6 and 8-10, the front face 74 of the barrel portion 70 of the adapter plate 60 contacts the outer surface 52 of the lip 48 when the wheel assembly 40 is arranged in the storage configuration 14 (e.g., in a manner opposite of the operating configuration 12, etc.). As shown in FIG. 6, the apertures of the barrel bolt pattern 76 are positioned around the barrel portion 70 of the adapter plate 60 to correspond with the apertures 54 positioned around the periphery of the lip 48. In one embodiment, the adapter plate 60 and the rim 42 are coupled with the plurality of bolts 56 extending through or pressed into the apertures of the adapter plate 60 and extending through the apertures 54 of the lip 48. Lug nuts 59 may secure the adapter plate 60 to the rim 42 in the storage configuration 14. In other embodiments, the adapter plate 60 and the rim 42 are otherwise coupled (e.g., interlocking, etc.).

According to an exemplary embodiment, the hub 36 of the axle 30 contacts the rear face 82 of the hub portion 80 of the adapter plate 60 when the wheel assembly 40 is arranged in the storage configuration 14 (e.g., in a manner the same as that of the operating configuration 12, etc.). As shown in FIGS. 6 and 8-10, the wheel end 34 of the axle 30 extends through the center bore 88 of the adapter plate 60 when the axle 30 is coupled to the adapter plate 60. In one embodiment, the apertures of the hub bolt pattern 86 are positioned around the hub portion 80 of the adapter plate 60 to correspond with the studs 38 positioned around the periphery of the hub 36. In one embodiment, the studs 38 engage the plurality of lug nuts 39 to secure the adapter plate 60 to the axle 30 and couple the wheel assembly 40 to the frame 22 of the lift device 10.

As shown in FIG. 6, a width $w_2'$ is defined when the wheel assembly 40 is coupled to the axle 30 with the adapter plate 60 in the storage configuration 14. The width $w_2'$ may be the distance between the longitudinal axis 26 and an outer portion of lift device 10 when the wheel assembly 40 and the axle 30 are coupled together in the storage configuration 14. The outer portion of the lift device 10 may be the inner barrel 44, the tire 58, or the wheel end 34 of axle 30, among other alternatives. The width $w_2'$ is directly related (e.g., proportional, linked, etc.) to the storage width $w_2$. By way of example, a decrease in the width $w_2'$ may provide a corresponding decrease in the storage width $w_2$. By way of example, the width $w_2'$ may be specified by specifying the offset distance $d_o$ of the adapter plate 60, positioning the lip 48 in a target location between the inner barrel 44 and the outer barrel 46, or positioning the hub 36 in a target location along the length of the axle 30, among other alternatives.

According to an exemplary embodiment, the width of the track of the lift device 10 is reduced when the arrangement of the wheel assemblies 40 is changed from the operating configuration 12 to the storage configuration 14. In one embodiment, at least one of the offset distance $d_o$ and the position of lip 48 are specified such that the track width of the lift device 10 is reduced from the working width $w_1$ to the storage width $w_2$, thereby facilitating the storage of the lift device 10 within the ISO container 200. In one embodiment, the rim 42 is consistent between the various configurations. When arranged in the storage configuration 14, the controller 120 may lock out operation of the lift device 10. In one embodiment, the sensor 130 indicates the configuration of the lift device 10, and the controller 120 may prevent an operator from controlling (e.g., lifting, extending, rotating, etc.) the lift boom 100 when the lift device 10 is in the storage configuration 14. Controller 120 may allow an operator to drive the lift device 10 when in the storage configuration 14 (e.g., to load the lift device 10 into the ISO container 200, to remove the lift device 10 from the ISO container 200, etc.).

Figure 11:
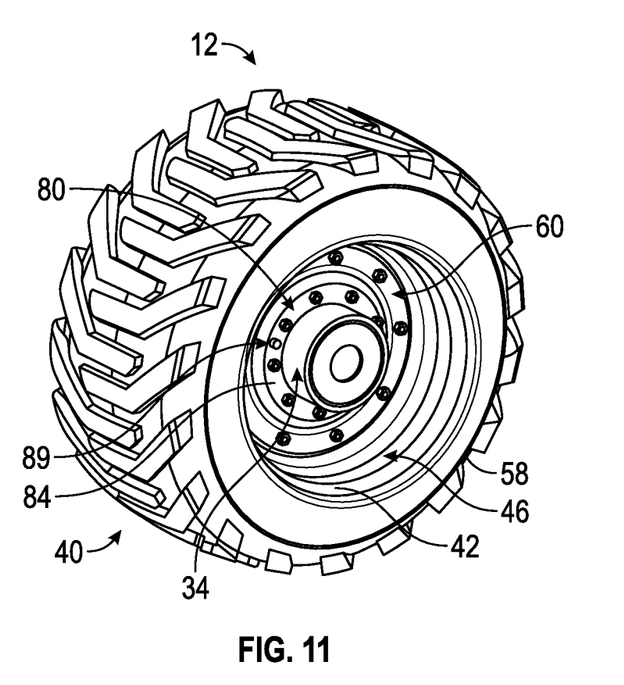
FIG. 11 is an outer perspective view of a wheel assembly, an axle, and an adapter plate in a first configuration, according to another exemplary embodiment.
Figure 12:
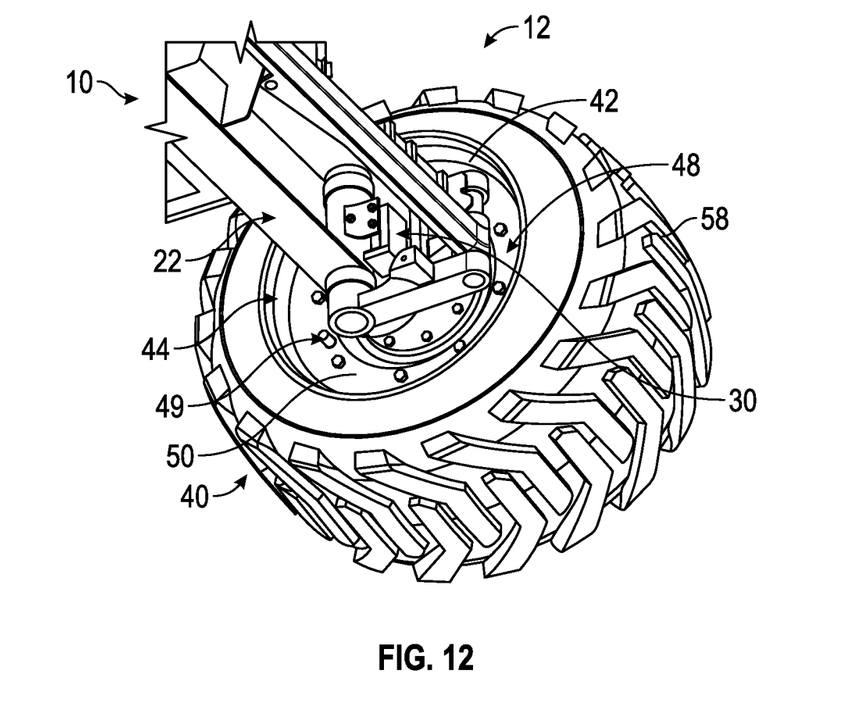
FIG. 12 is an inner perspective view of a wheel assembly, an axle, and an adapter plate in the first configuration, according to another exemplary embodiment.

According to the exemplary embodiment shown in FIGS. 11-14, at least one of the adapter plate 60 and the lip 48 of the rim 42 include a feature (e.g., a welded protrusion, a stamped feature, etc.) that prevents direct coupling to a surface thereof. According to an exemplary embodiment, the feature allows the wheel assembly 40 and the adapter plate 60 to be coupled to the lift device 10 in only two combinations (e.g., the operating configuration 12 and the storage configuration 14, etc.). As shown in FIGS. 11-12, the wheel assembly 40 is coupled to the axle 30 in the operating configuration 12. As shown in FIG. 11, the front face 84 of hub portion 80 of the adapter plate 60 includes a feature, shown as mounting feature 89. In one embodiment, the mounting feature 89 is a protrusion attached (e.g., welded, adhesively secured, etc.) to the front face 84. The mounting feature 89 extends outward from the front face 84. In another embodiment, the mounting feature 89 is a stamped feature that protrudes from the front face 84. The mounting feature 89 may substantially prevent an operator from coupling the front face 84 of the hub portion 80 of the adapter plate 60 directly to the hub 36 (i.e., prevent an operator from flipping the adapter plate 60, etc.). The mounting feature 89 does not inhibit the preferred coupling arrangement of the rear face 82 of the hub portion 80 of the adapter plate 60 directly to the hub 36 in the operating configuration 12.

As shown in FIG. 12, the inner surface 50 of the lip 48 of the rim 42 includes a feature, shown a mounting feature 49. In one embodiment, the mounting feature 49 is a protrusion attached (e.g., welded, adhesively secured, etc.) to the inner surface 50. The mounting feature 49 extends from the inner surface 50. In another embodiment, the mounting feature 49 is a stamped feature that protrudes from the inner surface 50. In other embodiments, the mounting feature 49 is otherwise positioned (e.g., along a surface of the inner barrel 44, etc.). The mounting feature 49 may substantially prevent an operator from coupling the inner surface 50 of the lip 48 directly to the barrel portion 70 of adapter plate 60. The mounting feature 49 does not inhibit the preferred coupling arrangement of the outer surface 52 of the lip 48 directly to the rear face 72 of the barrel portion 70 of the adapter plate 60 in the operating configuration 12.

Figure 13:
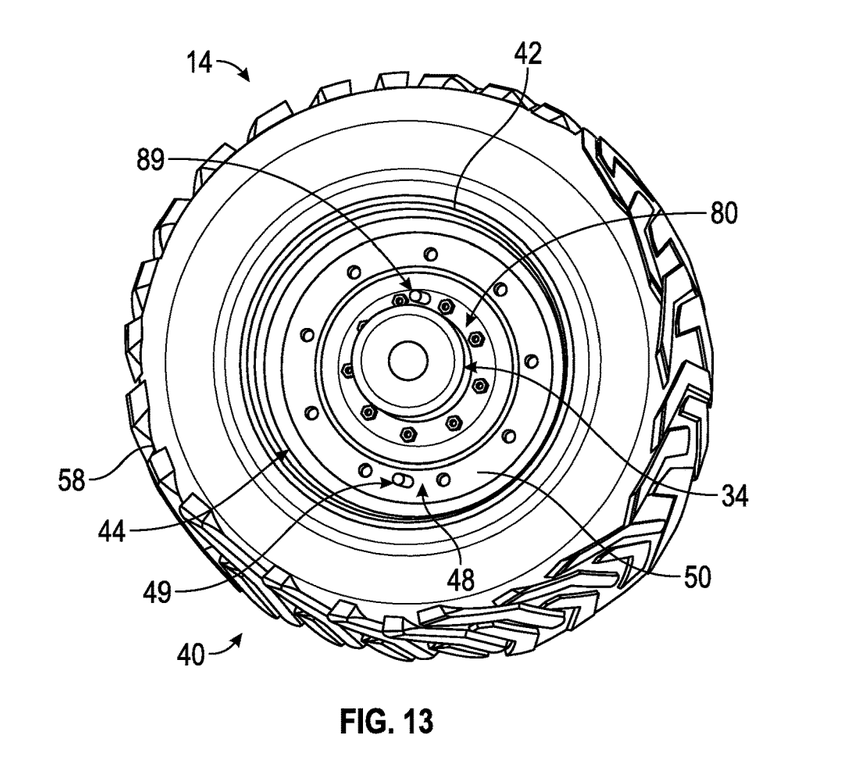
FIG. 13 is an outer perspective view of a wheel assembly, an axle, and an adapter plate in a second configuration, according to another exemplary embodiment.
Figure 14:
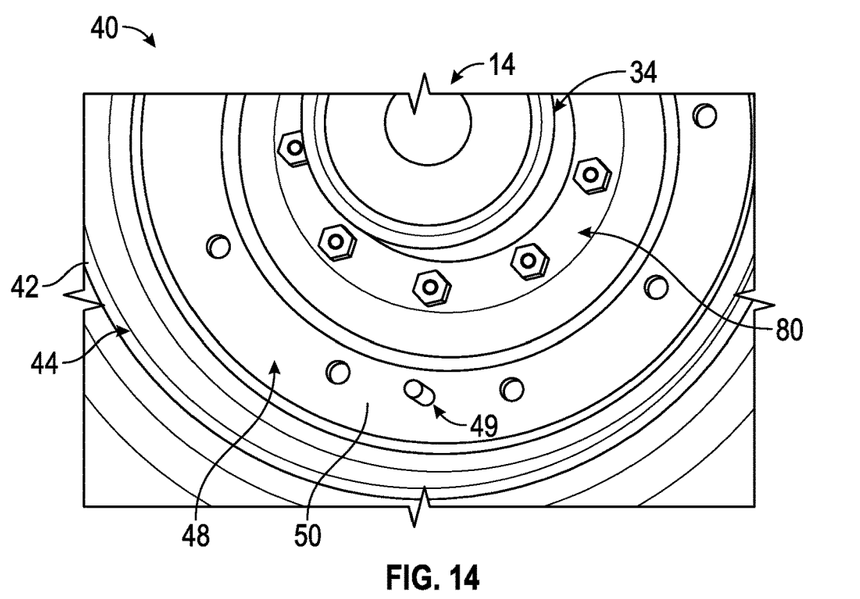
FIG. 14 is a detail outer perspective view of a wheel assembly, an axle, and an adapter plate in the second configuration, according to another exemplary embodiment.

As shown in FIGS. 13-14, the wheel assembly 40 is coupled to the axle 30 in the storage configuration 14. In the storage configuration 14, the mounting feature 89 may substantially prevent an operator from directly coupling the front face 84 of the hub portion 80 of the adapter plate 60 to the hub 36. The mounting feature 89 does not inhibit the preferred coupling arrangement of the rear face 82 of the hub portion 80 of the adapter plate 60 directly to the hub 36 in the storage configuration 14. The mounting feature 49 may substantially prevent an operator from coupling the inner surface 50 of the lip 48 to the barrel portion 70 of adapter plate 60. The mounting feature 49 does not inhibit the preferred coupling arrangement of the outer surface 52 of the lip 48 directly to the front face 74 of the barrel portion 70 of the adapter plate 60 in the storage configuration 14.

Figure 15:
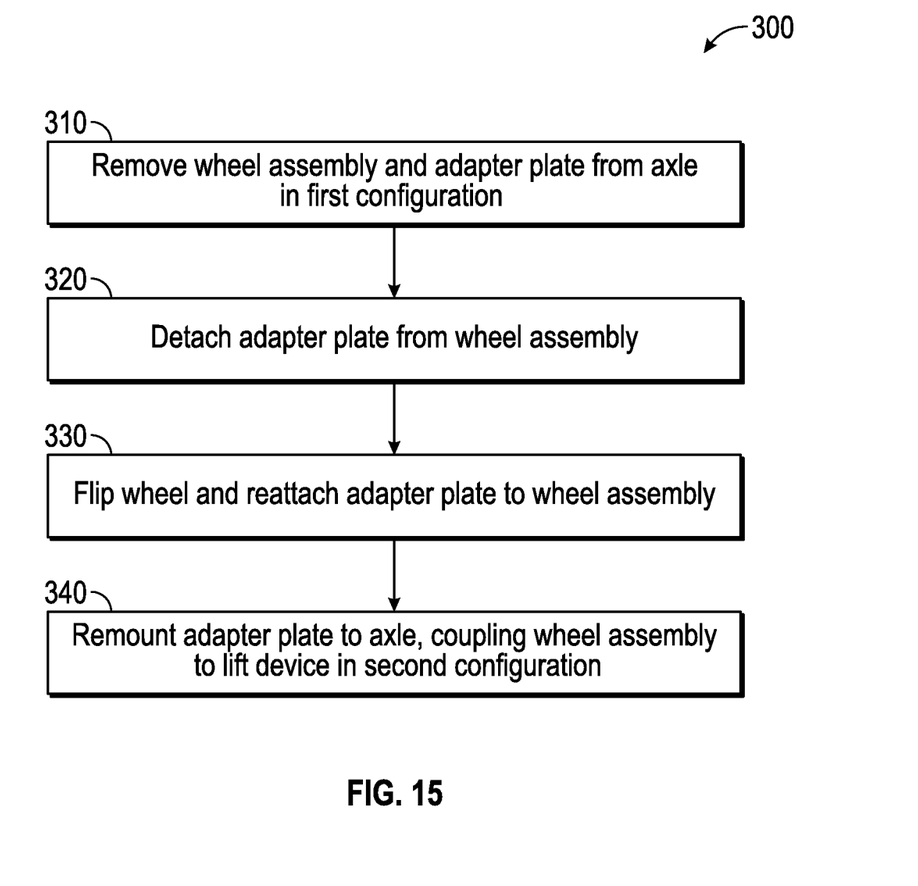
FIG. 15 is a method of changing a wheel assembly for a lift device from a first configuration to a second configuration, according to an exemplary embodiment.

According to the exemplary embodiment shown in FIG. 15, a method 300 for changing the wheel assembly 40 of the lift device 10 from the operating configuration 12 to the storage configuration 14 may be used in preparation to ship the lift device 10. The lift device 10 may be unable to fit into the ISO container 200 when arranged in the operating configuration 12. In order to reduce the track width, the lift device is arranged in the storage configuration 14, as described herein. At 310, the wheel assembly 40 and the adapter plate 60 are removed from the axle 30. A plurality of fasteners (e.g., lug nuts, etc.) securing the adapter plate 60 to the hub 36 may be unfastened and the wheel assembly 40 may be removed with the adapter plate 60. At 320, adapter plate 60 is detached (e.g., decoupled, etc.) from the wheel assembly 40. A plurality of fasteners coupling the rear face 72 of the barrel portion 70 of the adapter plate 60 to the outer surface 52 of the lip 48 of the rim 42 may be removed.

At 330, the wheel assembly 40 is flipped such that the outer barrel 46 faces towards the frame 22 of the lift device 10, and the adapter plate 60 is reattached to the wheel assembly 40. The front face 74 of the barrel portion 70 of the adapter plate 60 may be coupled to the outer surface 52 of the lip 48 of the rim 42. At 340, the adapter plate 60 is coupled to the axle 30, thereby attaching the wheel assembly 40 to the lift device 10 in the storage configuration 14. The rear face 82 of the hub portion 80 of the adapter plate 60 may be recoupled to the hub 36 of the axle 30 such that the lift device 10 is arranged in the storage configuration 14. The track width of the lift device 10 is thereby reduced from the working width $w_1$ to the storage width $w_2$, facilitating the storage of the lift device 10 within the ISO container 200.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A lift device, comprising:
a chassis including a frame;
a lift boom rotatably coupled to the frame;
a wheel assembly coupled to the frame and selectively reconfigurable between a first configuration and a second configuration, the wheel assembly comprising:
a rim having an inner barrel, an outer barrel, and a lip defining a first surface and an opposing second surface; and
a tire mounted to the rim;
an axle having a first end coupled to the frame and a second end including a hub, the hub including a plurality of studs positioned around a periphery of the hub; and
an adapter plate comprising:
a barrel portion defining a first face and an opposing second face;
a hub portion directly coupled to the hub and defining a plurality of apertures positioned to correspond with the plurality of studs of the hub of the axle; and
a transition portion extending between the barrel portion and the hub portion;
wherein the first face of the barrel portion of the adapter plate engages the opposing second surface of the lip when the wheel assembly is in the first configuration and the opposing second face of the barrel portion of the adapter plate engages the opposing second surface of the lip when the wheel assembly is in the second configuration thereby reducing a track width of the lift device;
wherein the hub portion of the adapter plate is sized to correspond with the hub of the axle, wherein the hub portion defines a first face and an opposing second face, wherein the first face of the hub portion of the adapter plate engages the hub of the axle; and
wherein the adapter plate includes a protrusion non-removably attached to the hub portion, extending from the opposing second face, and positioned to prevent an operator from coupling the opposing second face of the hub portion of the adapter plate to the hub of the axle.

2. The lift device of claim 1, wherein the lip of the rim defines a plurality of apertures positioned around a periphery of the lip.

3. The lift device of claim 2, wherein the barrel portion of the adapter plate defines a plurality of apertures positioned to correspond with the plurality of apertures positioned around the periphery of the lip of the rim.

4. The lift device of claim 3, wherein the rim includes a second protrusion non-removably attached to the lip, extending from the first surface, and positioned to prevent an operator from coupling the barrel portion of the adapter plate to the first surface of the lip.

5. The lift device of claim 1, wherein the track width of the lift device is set to a working width when the wheel assembly is arranged in the first configuration.

6. The lift device of claim 5, wherein the working width of the lift device is reduced such that the lift device is transportable within an ISO container when the wheel assembly is arranged in the second configuration.

7. A wheel assembly for a lift device, comprising:
a rim having an inner barrel, an outer barrel, and a lip defining a first surface and an opposing second surface;
a tire mounted to the rim;
an axle having a first end configured to be coupled to a frame of the lift device and a second end including a hub, the hub including a plurality of studs positioned around a periphery of the hub; and
an adapter plate comprising:
a barrel portion having a first face and an opposing second face;
a hub portion directly coupled to the hub and defining a plurality of apertures positioned to correspond with the plurality of studs of the hub of the axle; and
a transition portion extending between the barrel portion and the hub portion;
wherein the first face of the barrel portion of the adapter plate engages the opposing second surface of the lip when the wheel assembly is in a first configuration and the opposing second face of the barrel portion of the adapter plate engages the opposing second surface of the lip when the wheel assembly is in a second configuration thereby reducing a width of the wheel assembly;
wherein the hub portion of the adapter plate is sized to correspond with the hub of the axle, wherein the hub portion defines a first face and an opposing second face, wherein the first face of the hub portion of the adapter plate engages the hub of the axle; and
wherein the adapter plate includes a protrusion non-removably attached to the hub portion, extending from the opposing second face, and positioned to prevent an operator from coupling the opposing second face of the hub portion of the adapter plate to the hub of the axle.

8. The lift device of claim 7, wherein the lip of the rim defines a plurality of apertures positioned around a periphery of the lip.

9. The lift device of claim 8, wherein the barrel portion of the adapter plate defines a plurality of apertures positioned to correspond with the plurality of apertures positioned around the periphery of the lip of the rim.

10. The lift device of claim 9, wherein the rim includes a second protrusion non-removably attached to the lip, extending from the first surface, and positioned to prevent an operator from coupling the barrel portion of the adapter plate to the first surface of the lip.

11. A lift device, comprising:
a chassis including a frame;
a lift boom rotatably coupled to the frame;
a wheel assembly coupled to the frame and selectively reconfigurable between a first configuration and a second configuration, the wheel assembly comprising:
 a rim having an inner barrel, an outer barrel, and a lip defining a first surface, an opposing second surface, and a plurality of apertures positioned around a periphery of the lip; and
 a tire mounted to the rim;
an axle having a first end coupled to the frame and a second end including a hub; and
an adapter plate comprising:
 a barrel portion defining a first face, an opposing second face, and a plurality of apertures positioned to correspond with the plurality of apertures positioned around the periphery of the lip of the rim;
 a hub portion directly coupled to the hub; and
 a transition portion extending between the barrel portion and the hub portion;
wherein the first face of the barrel portion of the adapter plate engages the opposing second surface of the lip when the wheel assembly is in the first configuration and the opposing second face of the barrel portion of the adapter plate engages the opposing second surface of the lip when the wheel assembly is in the second configuration thereby reducing a track width of the lift device; and
wherein the rim includes a protrusion non-removably attached to the lip, extending from the first surface, and positioned to prevent an operator from coupling the barrel portion of the adapter plate to the first surface of the lip.

\* \* \* \* \*